United States Patent [19]
Danner et al.

[11] Patent Number: 5,851,236
[45] Date of Patent: Dec. 22, 1998

[54] AQUEOUS, CONCENTRATED POLYCARBOXYLIC ACID SODIUM SALT SOLUTIONS, THEIR PRODUCTION AND USE

[75] Inventors: Bernard Danner; Francis Palacin, both of Riedisheim, France

[73] Assignee: Clariant Finance (BVI) Limited, Tortola, Virgin Islands (Br.)

[21] Appl. No.: 911,506

[22] Filed: Aug. 14, 1997

[30] Foreign Application Priority Data

Aug. 15, 1996 [EP] European Pat. Off. ............ 968105445

[51] Int. Cl.⁶ ................................ D06P 1/52; D06P 5/08; C08K 5/17
[52] U.S. Cl. .......................... 8/137; 8/139; 8/465; 8/543; 8/557; 8/558; 8/594; 510/533; 510/434; 510/361; 252/180; 252/8.84; 252/8.85; 252/8.86; 210/698; 210/710
[58] Field of Search ................................ 8/137, 139, 465, 8/543, 557, 558, 594; 510/533, 434, 361; 252/180, 8.84, 8.85, 8.86; 210/698, 701

[56] References Cited

U.S. PATENT DOCUMENTS

| | | |
|---|---|---|
| 4,297,100 | 10/1981 | Koci et al. . |
| 4,952,324 | 8/1990 | McDonald et al. ...................... 210/697 |
| 5,672,674 | 9/1997 | Walz et al. . |

FOREIGN PATENT DOCUMENTS

| | | |
|---|---|---|
| 0 101 567 A2 | 7/1982 | European Pat. Off. . |
| 101567 | 2/1984 | European Pat. Off. . |
| 0 422 683 A1 | 4/1991 | European Pat. Off. . |
| 0 624 683 A1 | 5/1993 | European Pat. Off. . |
| 2 024 874 | 1/1990 | United Kingdom . |

*Primary Examiner*—Alan Diamond
*Attorney, Agent, or Firm*—Scott E. Hanf

[57] ABSTRACT

Aqueous, homogeneous 20 to 60% solutions (L) of mixtures of
(A) copolymers of
(x) (meth)acrylic acid
with (y) maleic acid or maleic acid anhydride in the molar ratio (x)/(y)=0.7/1 to 7/1, with an average molecular weight $M_w$ in the range of from 500 to 500'000, as free acids and/or sodium salts
and (B) Nitrilotriacetic acid as free acid and/or sodium salt, in which the weight ratio (A)/(B) is in the range of from 1/1 to 1/10 at least 25% of the total carboxy groups are present as sodium salt and the pH of (L) is in the range of from 5 to 11, are suitable as adjuvants for the treatment of fibrous material, in particular as scouring agents for dyeings of hydrophilic fibrous material.

17 Claims, No Drawings

AQUEOUS, CONCENTRATED POLYCARBOXYLIC ACID SODIUM SALT SOLUTIONS, THEIR PRODUCTION AND USE

In the processing of hydrophilic fibrous material, in particular of textile material, in various processing stages (pretreatment, dyeing, aftertreatment) there are employed the respective suitable adjuvants, e.g. for desizing, in dyeing, for dispersing certain dyes or for the scouring of dyeings. An appreciated category of adjuvants for the mentioned processing stages are polycarboxylic acids, e.g. (meth)acrylic acid copolymers principally those containing polymerized constituting maleic acid units, and/or aminopolycarboxylic acids. From EP-A 0101567 are known concentrated, aqueous, homogeneous, 25 to 60 weight-% solutions of mixtures of a) homopolymers of acrylic acid and/or copolymers of acrylic acid with up to 50 weight-% of maleic acid and/or maleic acid anhydride and K-values of 10 to 25 and b) nitrilotriacetic acid, polyaminopolycarboxylic acids, polyaminopolyphosphonic acids and/or hydroxyalkane polyphosphonic acids, all of the dissolved components, or at least up to 20% thereof, being in the form of the potassium salts and, in the latter case, the remainder being in the form of the free acid, having a pH-value of 3 to 7, and their use as a combined dispersing and metal iron complex forming agent in pretreatment or dyeing baths for textile goods consisting of cellulose or containing cellulose.

The invention defined in EP-A 0101567 is based on having established that it is not possible to dissolve in water mixtures of the sodium salts together in the desired concentration (their being intended 25 to 60%) since both components salt out each other at these concentrations and solutions of at most 10% concentration are then stable. Out of this statement, there have been produced the comparatively costlier and heavier potassium salts which display the there described stabilities, while accepting, however, a certain incompatibility with other polymeric surfactants such as alkylphenol ethoxylates.

In the art it is, however, desired to employ products as economical as possible and which do not display the impediment of certain incompatibilities with components which may occur in the processes, since such incompatibilities may cause for instance interruptions and/or modifications of pre-programmed processes or even, eventually, render impossible the performance of some treatment processes.

It has now, surprisingly, been found that the below described copolymers of (meth)acrylic acid and maleic acid or maleic acid anhydride together with nitrilotriacetic acid, in the indicated quantitative ranges and in the indicated sodium salt form, give concentrated solutions as defined below of surprisingly good stability, without it being necessary to produce the potassium salts.

The invention relates to the below defined concentrated solutions (L), their production and their use.

The invention thus provides aqueous homogeneous 20 to 60% solutions (L) of mixtures of (A) copolymers of (x) (meth)acrylic acid with (y) maleic acid or maleic acid anhydride in the molar ratio (x)/(y) 0.7/1 to 7/1, with an average molecular weight $M_w$ in the range of from 500 to 500'000, as free acids and/or sodium salts, and (B) Nitrilotriacetic acid as free acid and/or sodium salt, the weight ratio (A)/(B) being in the range of from 1/1 to 1/10, at least 25% of the total carboxy groups being present as sodium salts and the pH of (L) being in the range of from 5 to 11.

The copolymers (A) contain the polymerized constituting (meth)acrylic acid monomer units and maleic acid monomer units in the indicated molar ratio (x)/(y). The molar ratio (x)/(y) is advantageously in the range of from 1/1 to 6/1, preferably 2/1 to 5/1, a particular category of copolymers (A) being represented by those in which the molar ratio (x)/(y) is <3.6/1. The average molecular weight (weight average) $M_w$ of (A) is advantageously in the range of from 1000 to 200'000, in particular 1200 to 50'000, measured against polyacrylic acid standards.

The copolymers (A) may be produced in a manner known per se or analogously to known methods by copolymerisation of the mentioned monomers in the indicated molar ratio, advantageously in aqueous solution. Advantageously, there is employed a polymerization catalyst or a mixture of polymerization catalysts, mainly peroxy compounds, for instance sodium or potassium persulphate, benzoyl peroxide, hydrogen peroxide or a corresponding alkali metal peroxide, e.g. sodium or potassium peroxide, for instance $\leq 0.2$ mols of catalyst, advantageously 0.002 to 0.1 mols of catalysts, per mol of monomer. The polymerization advantageously takes place at pH values in the range of from 0.1 to 10, preferably 1 to 6, the pH being expediently adjusted with sodium hydroxide so that the polymerization product is formed in the form of (partial) sodium salt. The molecular weight of the polymer may be directed by suitable choice of the quantity of catalyst and/or by employing chain transfer agents. In general, chain transfer agents known per se are suitable, e.g. salts of polyvalent metals, optionally in combination with alkali metal and/or ammonium, with strong mineral acids, e.g. iron, copper or manganese sulphates, iron, copper or calcium chlorides, iron, copper, calcium or manganese phosphates. The polymerization takes place advantageously in the temperature range of from 60° to 130° C., preferably 80° to 100° C.

The solutions (L) of the invention may be produced by plain admixing of the respective aqueous solutions of the components (A) and (B) in the respective concentration and, if required, pH-adjustment with NaOH-solution or a strong acid (e.g. a strong mineral acid or carboxylic acid).

According to a preferred procedure, the concentration of the monomers and of the further components in the polymerization reaction mixture is chosen in such a way that, by the addition of component (B), e.g. in the form of concentrated solution, there is formed directly the solution (L).

The nitrilotriacetic acid is advantageously employed in the form of sodium salt, e.g. di- or trisodium salt and as concentrated solution, e.g. 20 to 60% solution, or even in solid form (e.g. 90 to 100%—the remainder up to 100%, i.e. 0 to 10%, being water of crystallization and/or crystal humor).

The weight ratio (A)/(B) is advantageously in the range of from 1/1,2 to 1/6, preferably 1/2 to 1/5, component (A) being calculated as free acid and component (B) as trisodium salt. Of particular relevance are those solutions (L), in which the weight ratio (A)/(B) is <1/2.

The pH of the solutions (L) of the invention is advantageously in the range of from 6 to 10, with particular preference 8 to 10. The pH is, if required, (depending on the desired pH) adjusted by addition of sodium hydroxide solution either in the polymerization or, if a copolymer is employed in acid form, before, during or after admixing component (B). For pH-values in the acidic range and with correspondingly high proportions of component (B) it may occasionally suffice to add component (B) as trisodium salt. Advantageously, however, the pH is adjusted with soda lye to the above indicated preferred ranges. Advantageously, at least 50% of the total carboxy groups is in sodium salt form, preferably at least 70%, in particular 75 to 95% thereof.

If desired, to the solutions (L) there may be added (Z) a rot protection agent (e.g. a fungicide)

for instance in concentration of from 0.0001 to 0.1% by weight, preferably 0.005 to 0.05% by weight of (Z), referred to (L).

The solutions (L) of the invention are in general stable against the influence of heat and frost and distinguish also by their good stabilities to storage and shipment. They are liquid and well meterable and may be employed directly for use.

The concentrated solutions of (L) the invention find their use in all those fields of fibre treatment in which (meth) acrylic acid polymers in sodium salt form are employable, in particular in combination with (B), e.g. in the textile pretreatment for desizing of cellulose textile material, or as dispersing agents for dyes (e.g. in dyeing procedures and/or for pigments and/or disperse dyes), or in dyeing as complexing agents for hardness-forming cations, before all, however, as scouring agents for dyeings of hydrophilic fibrous material, with the purpose of eliminating non-fixed dyes from the dyed substrate.

The fibrous substrate may be in any processing form as may occur as dyed material for scouring of the non-fixed portion of the dyeing, e.g. as yarns, yarn strands, spools, weavings, knittings, fleeces, tuftings or half-ready-made or ready-made soft goods. The fibrous material is in general hydrophilic material as is e.g. dyed with non ionic or/and anionic dyes, for instance polyamide fibrous material (principally wool) or cellulose (e.g. cotton, hemp, linen or viscose-rayon). Of particular relevance are cellulosic textile materials that have been dyed with reactive dyes or sulphur dyes.

The dyeings to be scoured may be exhautions dyeings or also impregnated goods, e.g. pad dyeings (e.g. produced according to continuous methods) or also prints.

For dyeings with sulphurdyes the sulphurdye is in general reduced in the presence of alkali to the corresponding leuco form which is then soluble in the liquor as alkali thiolate and is applied to the goods in this dissolved form; after dyeing, the leuco form of the dye is transformed (re-oxidized) on the substrate to the sulphur dye form by oxidation, e.g. by aerating and/or treatment with a dissolved oxidizing agent (e.g. hydrogen peroxide). The liquor is in general alkaline.

For the dyeing with reactive dyes, in particular those which contain halogen-substituted heterocycles (principally pyrimidine rings or triazine rings) dyeing is also carried out in alkaline medium, while in general there are added further electrolytes to the dyebath or impregnation liquor.

Before scouring the dyeings may be rinsed, for which, before the addition of (L), a neutralization of the goods to be scoured is not necessary.

It is also possible, for scouring, to combine the solutions (L) with other scouring agents e.g. with detergent surfactants; advantageously, however, the solutions (L) are employed as sole scouring agents without surface active additions. For scouring there are advantageously employed such quantities of (L) as correspond to a concentration of (A)+(B) in the range of 0.05 to 5 g/l, preferably 0,5 to 2 g/l. The liquor ratio of substrate to (L)-containing liquor is e.g. in the range of 1:3 to 1:40, preferably 1:5 to 1:25. The aftertreatment with (L) according to the invention takes place advantageously at pH-values in the range of from 4 to 13, preferably in the basic range, in particular in the pH-range of from 8 to 12. If required, the pH may be adjusted with conventional bases, e.g. with sodium hydroxide or preferably sodium carbonate. The aftertreatment with (L) of the invention takes place advantageously at elevated temperature e.g. at temperatures $\geq 60°$ C., preferably in the temperature range of from 80° C. to boiling temperature. With particular advantage scouring is carried out at the boil. The scoured goods may very easily and well be rinsed with water and there are obtained dyeings of optimum fastnesses (especially wet fastnesses and fastnesses to rubbing).

In the following Examples the parts signify parts by weight and the percentages signify percentages by weight; the temperatures are indicated in degrees Celsius. In the Application Examples, the percentages refer to the substrate, if not otherwise indicated; "C.I." stands for "Colour Index".

EXAMPLE 1

95.0 parts of demineralized water, 57.4 parts of maleic acid anhydride and 0.1 parts of ammonium/-iron(III)-sulphate dodecahydrate are heated to 95°–100° C. Then 137.2 parts of 30% soda lye, 137.2 parts of acrylic acid and 79.8 parts of a solution of 17.5 parts of sodium persulphate and 7.5 parts of hydrogen peroxide (of 35% strength) in 54.8 parts of water are regularly added dropwise within 5 hours at 95°–100° C. Then the reaction is allowed to complete during 1 hour at 95°–100° C. and the mixture is cooled to ambient temperature and after addition of 66.8 parts of 30% soda lye, 1675.0 parts of a 40% aqueous solution of nitrilotriacetic acid trisodium salt and 255.0 parts of demineralized water, it is discharged. The so obtained composition is a solution and displays a pH-value of 9.0±0.3.

EXAMPLE 2

The procedure is as described in Example 1, with the difference that there are employed 65.2 parts of maleic acid anhydride and 125.7 parts of acrylic acid. The composition obtained is a solution and displays a pH-value of 9.0±0.3.

EXAMPLE 3

The procedure is as described in Example 1, with the difference that there are employed 49.6 parts of maleic acid anhydride and 148.7 parts of acrylic acid. The composition obtained is a solution and displays a pH-value of 9.0±0.3.

EXAMPLE 4

The procedure is as in Example 1, with the difference that 204.0 parts of 30% soda lye are metered into the mixture together with the acrylic acid and after polymerization no further soda lye is added. The composition obtained is a solution and displays a pH-value of 9.0±0.3.

APPLICATION EXAMPLE A

An exhaustion dyeing obtained with 4% C.I. Reactive Blue 79 on cotton tricot is aftertreated in the following way: immediately after the dyeing: it is rinsed first at 60° C. and then cold and then treated at the boil with 1 g/l of the composition according to example 1 at a goods-to-liquor ratio of 1:20. Then it is again rinsed at 60° C. and then cold, and finally dried. The goods are kept in each rinsing bath for 10 minutes at a goods-to-liquor ratio of 1:20. There is obtained a dark navy-blue dyeing with good fastness to washing.

APPLICATION EXAMPLE B, C AND D

Analogously as the composition of Example 1 there is employed in Application Example A each one of the compositions of Examples 2, 3 and 4. There are also obtained dark navy blue dyeings with good fastness to washing.

APPLICATION EXAMPLE E

A rinsed and oxidized cotton dyeing of 5% C.I. Leuco Sulphur Black 1 (added in the form of a 25% aqueous composition), is aftertreated under the conditions indicated in Application Example A. There is obtained a black dyeing with a very high level of fastness to washing.

APPLICATION EXAMPLES F, G AND H

Analogously as the composition of Example 1 there is employed in Application Example E each one of the compositions of Examples 2, 3 and 4. There are also obtained black dyeings with a very high level of fastness to washing.

We claim:

1. Aqueous, homogeneous 20 to 60%, by weight, solution (L) of a mixture of
   (A) copolymers of (x) (meth)acrylic acid with (y) maleic acid or maleic acid anhydride in the molar ratio (x)/(y) =0.7/1 to 7/1, with an average molecular weight $M_w$ in the range of from 500 to 500,000, as free acids and/or sodium salts and
   (B) Nitrilotriacetic acid as free acid and/or sodium salt, in which the weight ratio (A)/(B) is in the range of from 1/1 to 1/10, at least 25% of the total carboxy groups, in (A) and (B), are present as sodium salt and the pH of (L) is in the range of from 5 to 11.

2. Solution (L) according to claim 1, further containing
   (Z) a rot protection agent.

3. A method of treating fibrous material comprising the steps of:
   providing a fibrous material;
   providing an aqueous, homogeneous solution (L) as claimed in claim 1; and
   contacting said fibrous material with said aqueous, homogeneous solution (L) to obtain a treated fibrous material.

4. A method of treating fibrous material according to claim 3, wherein said fibrous material is hydrophilic.

5. A method of treating fibrous material according to claim 3, wherein said fibrous material is cellulose.

6. A method of treating fibrous material according to claim 5, wherein said fibrous material is dyed with a reactive dye.

7. A method of treating fibrous material according to claim 5, wherein said fibrous material is dyed with a sulfur dye.

8. A method of treating fibrous material according to claim 3, wherein no additional surface active detergents are used.

9. A method of treating fibrous material comprising the steps of:
   providing a fibrous material;
   providing an aqueous, homogeneous solution (L) as claimed in claim 2; and
   contacting said fibrous material with said aqueous, homogeneous solution (L) to obtain a treated fibrous material.

10. A method of treating fibrous material according to claim 9, wherein said fibrous material is hydrophilic.

11. A method of treating fibrous material according to claim 9, wherein said fibrous material is cellulose.

12. A method of treating fibrous material according to claim 11, wherein said fibrous material is dyed with a reactive dye.

13. A method of treating fibrous material according to claim 11, wherein said fibrous material is dyed with a sulfur dye.

14. A method of treating fibrous material according to claim 9, wherein no additional surface active detergents are used.

15. A method of treating fibrous material comprising the steps of:
    providing a dyed fibrous material;
    rinsing said dyed fibrous material;
    contacting with a solution (L), according to claim 1, to obtain a treated dyed fibrous material; and
    rinsing said treated dyed fibrous material.

16. A method of treating fibrous material according to claim 15, wherein said dyed fibrous material was dyed with a reactive dye.

17. A method of treating fibrous material according to claim 15, wherein said dyed fibrous material was dyed with a sulfur dye.

* * * * *